(12) United States Patent
Cobos De La Fuente

(10) Patent No.: US 8,354,031 B2
(45) Date of Patent: Jan. 15, 2013

(54) LIQUID FILTERING SYSTEM AND ITS AUTOMATIC CLEANING PROCEDURE

(75) Inventor: Alfonso Cobos De La Fuente, Madrid (ES)

(73) Assignee: Universidad Politecnica de Madrid, Madrid (ES)

( * ) Notice: Subject to any disclaimer, the term of this patent is extended or adjusted under 35 U.S.C. 154(b) by 577 days.

(21) Appl. No.: 12/517,478

(22) PCT Filed: Dec. 4, 2007

(86) PCT No.: PCT/ES2007/000709
§ 371 (c)(1),
(2), (4) Date: Feb. 9, 2010

(87) PCT Pub. No.: WO2008/071814
PCT Pub. Date: Jun. 19, 2008

(65) Prior Publication Data
US 2010/0140183 A1 Jun. 10, 2010

(30) Foreign Application Priority Data
Dec. 5, 2006 (ES) .................. 200603116

(51) Int. Cl.
*B01D 21/26* (2006.01)
*B01D 25/38* (2006.01)
*B01D 29/58* (2006.01)
*B01D 29/60* (2006.01)
*B01D 29/64* (2006.01)
*B01D 36/02* (2006.01)

(52) U.S. Cl. ........ 210/788; 210/793; 210/806; 210/222; 210/304; 210/313; 210/443; 210/489; 210/512.1

(58) Field of Classification Search ................. 210/788, 210/793, 806, 232, 304, 313, 443, 489, 512.1
See application file for complete search history.

(56) References Cited

U.S. PATENT DOCUMENTS 4,692,247 A 9/1987 Orlans
6,632,352 B2 * 10/2003 Holt .............................. 210/232

FOREIGN PATENT DOCUMENTS

EP 1 275 727 1/2003
(Continued)

OTHER PUBLICATIONS

The Translation for the Written Opinion for PCT/ES2007/000709, Apr. 2008.*

*Primary Examiner* — David A Reifsnyder
(74) *Attorney, Agent, or Firm* — Merchant & Gould P.C.

(57) ABSTRACT

A filtering system for water and other liquids includes different filtering stages in the same element, with its cleaning being done automatically by a new procedure. The filtering system includes a cylindrical outer casing with the pipe of the water to be filtered penetrating tangentially through its base, using centrifugal force in the first filtering stage to separate the particles with greater density. Then the liquid takes a helicoidal path and passes through different filtering devices, such as mesh or rings with the filtered and, therefore, clean water finally being collected in an appropriately perforated central pipe that comes out of the filter through the center of its lower base. The system is used for the cleaning of liquids, basically water, in agriculture for localized irrigation, in industry, or the environment.

12 Claims, 3 Drawing Sheets

FOREIGN PATENT DOCUMENTS

| | | |
|---|---|---|
| ES | 1 040 967 | 6/1999 |
| ES | 1 042 502 | 9/1999 |
| ES | 1 048 818 | 3/2001 |
| ES | 1 052 105 | 11/2002 |
| ES | 2 190 905 | 9/2003 |
| ES | 2 200 901 | 3/2004 |
| WO | WO 01/12293 | 2/2001 |
| WO | WO 01/93982 | 12/2001 |
| WO | WO 2008071814 A1 * | 6/2008 |

* cited by examiner

LIQUID FILTERING SYSTEM AND ITS AUTOMATIC CLEANING PROCEDURE

This application is a National Stage Application of PCT/ES2007/000709, filed 4 Dec. 2007, which claims benefit of Serial No. P200603116, filed 5 Dec. 2006 in Spain and which applications are incorporated herein by reference. To the extent appropriate, a claim of priority is made to each of the above disclosed applications.

PURPOSE OF THE INVENTION

This invention refers to a filtering system for water and other liquids that includes different filtering stages in the same element, with its cleaning being done automatically by a new procedure.

TECHNICAL SECTOR

The filtering system subject of this invention has a diverse scope of application, being well suited in the agriculture sector, the industrial sector, in desalinisation plants, and the urban and environmental sectors.

BACKGROUND OF THE INVENTION

Liquids normally contain in suspension diverse undesired solid particles. Therefore, in order to eliminate the particles that the water and other liquids contain, different types of filters are used.

In agriculture, the physical cleaning of the water is necessary in localised irrigation procedures, for which reason the use of different filters is required, which are known as sand, mesh and ring filters, according to their filtering element. Cyclones are also used, referred to in this manner because their filtering is based on centrifugal force.

Industry also uses filtering systems, although in processes or for the dumping of polluted water to public channels; after passing through the filters, the water is more environmentally tolerable.

The following patents are known: the European patent ES 2 200 901 T3 deals with a single-sieve mesh filter with mechanical cleaning by a motor; invention U.S. Pat. No. 4,692,247 refers to a filter with cleaning paddles; the utility model U 9900677 shows a simple ring filter, and U 200201423 presents a filter with double housing of ring cartridges.

The different types of existing filtering systems intend to obtain water without solid particles with a diameter over a certain value, and with easy cleaning when they become silted. These objectives are not easily obtained. Normally different filters are placed in a series, inside a shed built for the purpose, requiring a large space and connection pieces. The energy losses are high, as a consequence of designs not taking care of this aspect and of their installation.

This invention places the filtering elements successively in a single metallic casing, which enormously simplifies the installation, with less energy loss. In addition, the ease of cleaning, even automatic, solves the existing problems, contributing new advantages that will be made clear throughout this description.

DESCRIPTION OF THE INVENTION

This invention is comprised of a liquid filtering system and its automatic cleaning procedure. The device is comprised by the following essential parts:

- A vertical cylindrical outer casing in whose interior are housed the filtering elements necessary to carry out the elimination of solid impurities in different successive phases.
- A pipe that penetrates tangentially through the lower base of the abovementioned outer cylindrical casing through which the liquid to be filtered enters.
- An interior collector pipe concentric to the outer casing with a lower outlet for the filtered liquid.
- A removable, watertight lid placed in the upper base of the outer cylindrical casing.

The filtering system is comprised, therefore, of a vertical outer cylindrical casing in whose interior are housed the filtering elements necessary to carry out the elimination of solid impurities from the liquid in different successive phases. For the entry of the liquid to be filtered, there is a pipe that penetrates tangentially the lower base of the cylindrical outer casing continuing with a piece to adapt the flow that makes the gradual change from the section to a rectangular section that produces circular movements, for which reason the heavy particles descend and approach the periphery, through the forces of gravity and centrifuge acting on them. In this lower area is placed a trap to collect these heavy particles, which are stored in a lower impurities chamber. Following this first filtering stage, the fluid flow follows a warped solid surface arranged to drive the fluid with an ascending helicoidal movement.

The flow with helicoidal movement is used to pull the impurities towards the periphery and the highest areas of the device, removing them from the more active filtering parts, which receive in this way an additional cleaning.

The following filtering stages are produced by the successive insertion in the flow of different filtering elements with concentric cylindrical surface shapes or of a circular crown for the ring packages.

This arrangement is advisable, in the first place, because all the filtering elements are within the same casing, with a considerable reduction of space and of connection pieces. In the second place, the passing of the fluid is done hydrodynamically, with the filtering elements being successively inserted in the flow of the liquid, without abrupt changes in its movement, and producing less load loss.

A removable watertight lid is placed in the upper base of the aforementioned outer cylindrical casing. One or several suction ball mechanisms are situated on this lid to facilitate the inlet and outlet of air in filling and emptying the filter. This lid has several circular concentric notches for fastening the filtering elements; on the one with the largest diameter is fastened a cylindrical mesh panel and in the smallest of these notches is centred a spring that produces the compression of a package of slotted rings placed concentrically to the interior collector pipe. This spring acts on an omega-shaped piece that guides the spring and whose inner part adapts to the upper part of the interior collector pipe concentric to the outer casing, leaving between both parts a chamber of variable volume, connected by means of a pipe with a small diameter directly to the outlet of the abovementioned interior collector pipe.

The lower part of the filter is comprised by a chamber which drains all of the impurities, supporting, in addition, the filtering elements. Some one-way hatches allow the flow to exit towards this chamber, with the dirt particles that did not pass through the filtering elements, but never flowing in the other direction.

Normally, filtering systems are installed forming an equipment set of several units. All the filters are connected parallel to each other between the general pipes with the gross liquid inlet and the general outlet collector of clean filtered liquid.

Another collector will drain the dirt from the lower chambers. Each one of these three pipes will be equipped with a valve to regulate the flow.

The functioning of the proposed device is clearly understood after the previous description and is comprised of two well-differentiated processes: the filtering and the cleaning.

During the filtering process the gross liquid that enters the filter equipment passes through each of them in different stages, leaving the retained solid particles, and with the clean liquid going into the general filtered liquid collector.

But the dirt accumulated during the filtering silts the filtering elements and must be removed at some time. This cleaning process is begun with the closing of the valve located at the entrance of the tangential pipe at the lower base of the cylindrical casing and the two-way valve located at the outlet of the interior collector pipe, while opening the valve located at the outlet of the lower impurities chamber, and therefore the liquid is discharged through this chamber, pulling the dirt, with two floating brushes housed among the filtering elements collaborating with this, which move by the raising and lowering of the liquid in the filter and scraping the filter surfaces and sweeping away the dirt. Returning the valves to their filtering position again puts the filter in operating order with minimal inactive time.

A more exhaustive cleaning would be carried out from the previous gravity stage, by means of cleaning by reverse flow. In this process, you open the valve that connects to the filtered liquid collector, which now will come from the rest of the filters, which penetrates through the interior collector pipe, starting the cleaning of the set with reverse flow or, as it is also called, backwash. In this situation the maximum pressure, which is found in the connection to the filtered liquid collector, is transmitted through a pipe with a small diameter to the variable chamber comprised between the omega-shaped piece and the upper part of the interior collector pipe, with the spring action giving way and decompressing the package of rings. At the same time water shoots out of the holes in the perforated interior collector pipe, drilled with the appropriate angle and placement so that by hitting the inside of the ring package it produces the spinning and separation of them, enhancing the cleaning of the retained particles in its slots. The reverse flow sweeps the impurities, passing through the one-way hatches to the lower impurities chamber and together with the dense solids trapped during the gravity stage, all pass to the outside.

The operations of filling and emptying the filter are repeated by operating the valve of the filtered liquid collector as many times as is deemed necessary, according to the degree of cleaning required, at which time the entry flow of the gross liquid is reestablished and, closing the drainage outlet, the entry pressure in the filter is recovered as well as its filtering operations.

Both processes can always be done manually, but in the equipment comprised by various filter units the automated form is recommended for the proper functioning of the supply network, always ensuring the correct outlet pressure by means of the regulating valve located in the last filter. When this pressure is minimal, the sequence of washing the filters begins, normally controlled by programming.

DESCRIPTION OF THE PREFERRED WAY OF EXECUTING THE INVENTION

Figure 1:
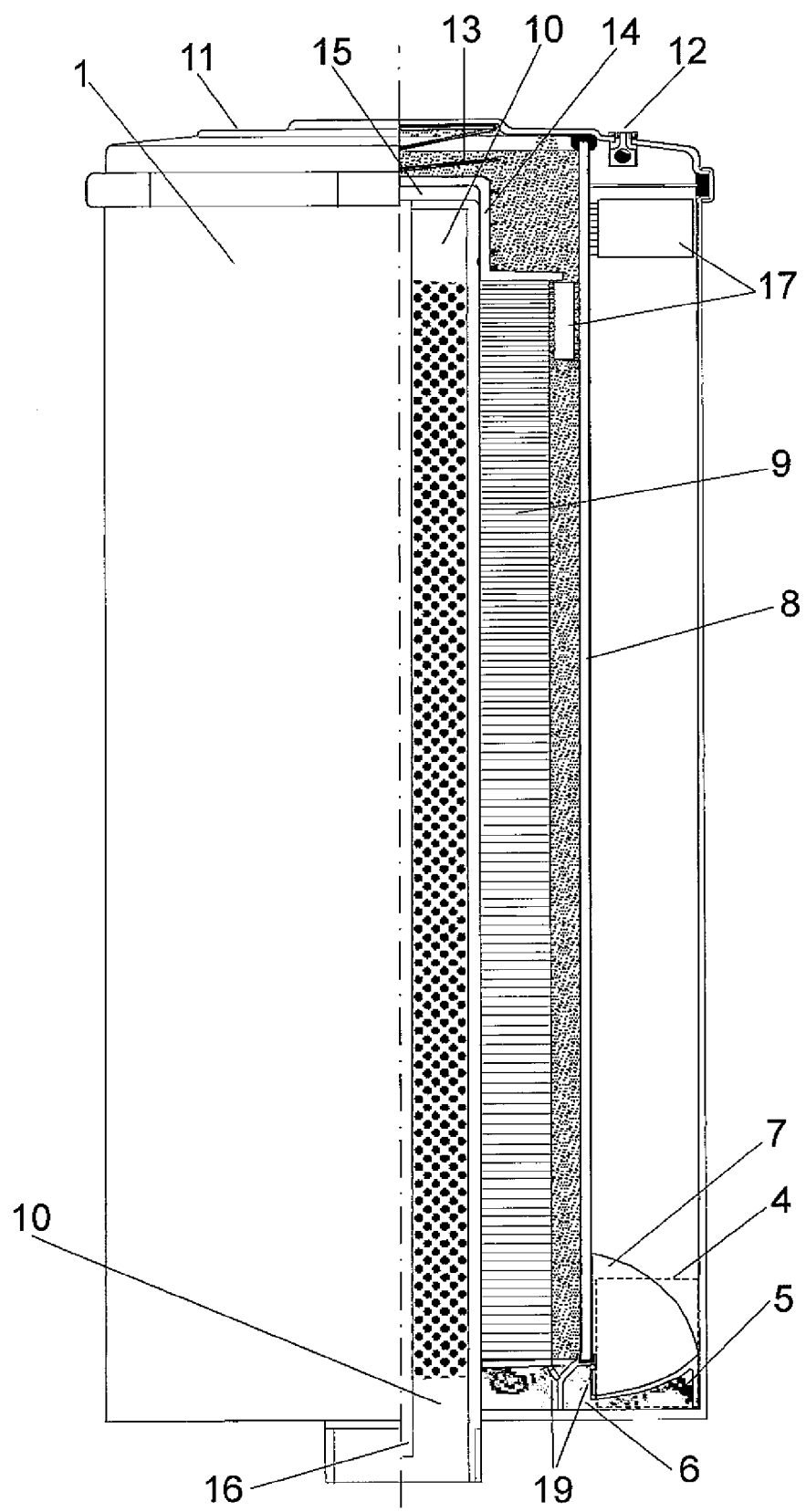
FIG. 1 represents the elevation of the filter, sectioned by a quarter.
Figure 2:
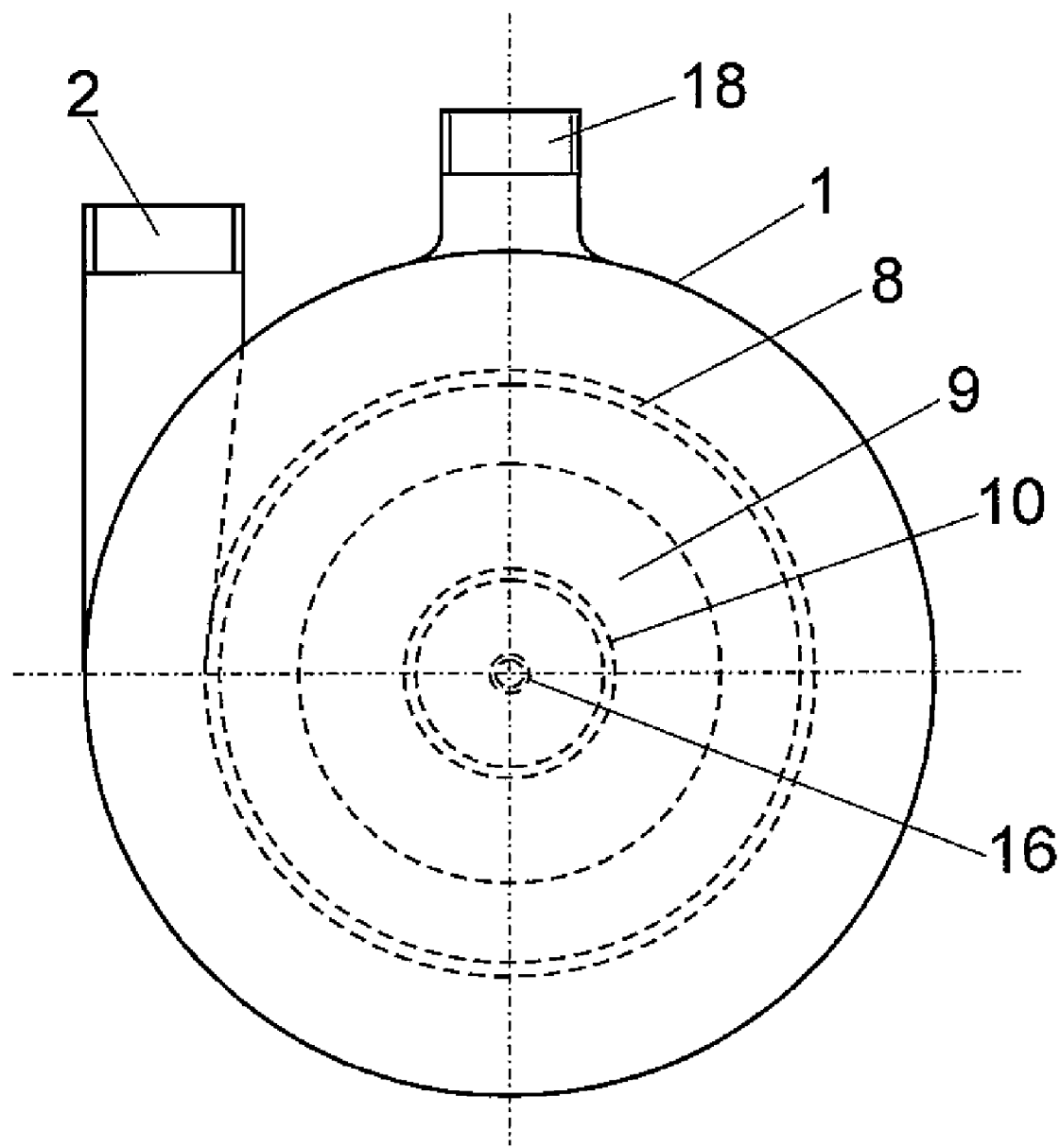
FIG. 2 shows the plan of the filter.
Figure 3:
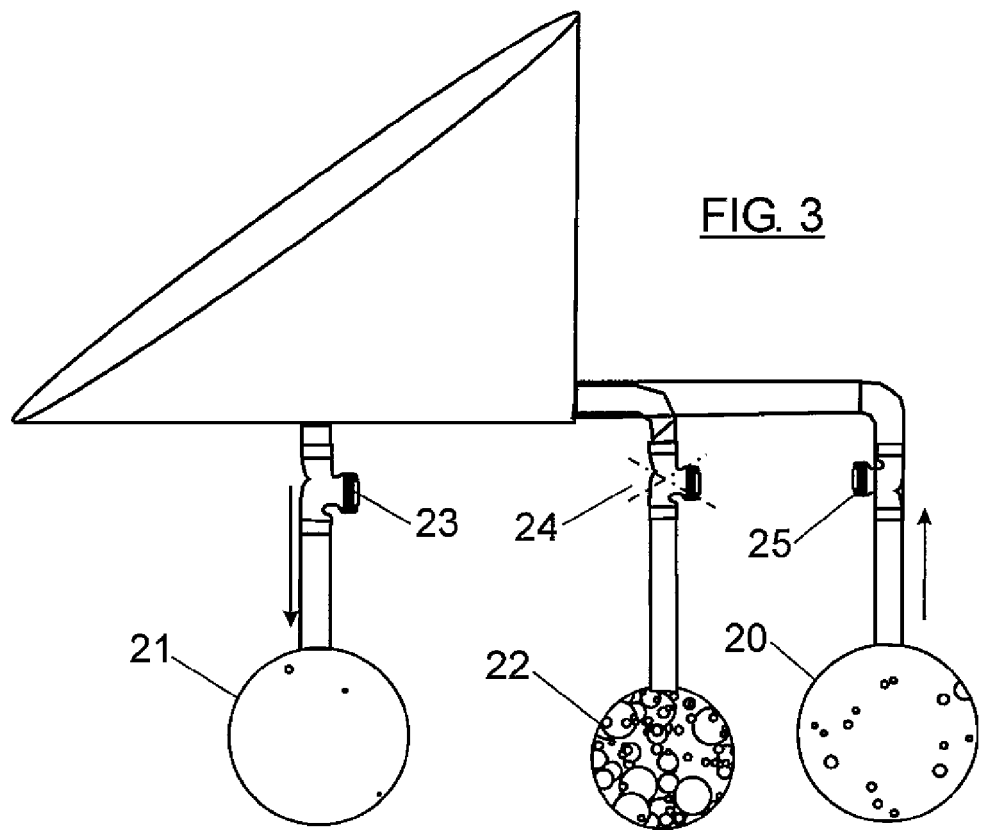
FIGS. 3 and 4 outline the directions of the flow in the filtering process and in cleaning.
Figure 4:
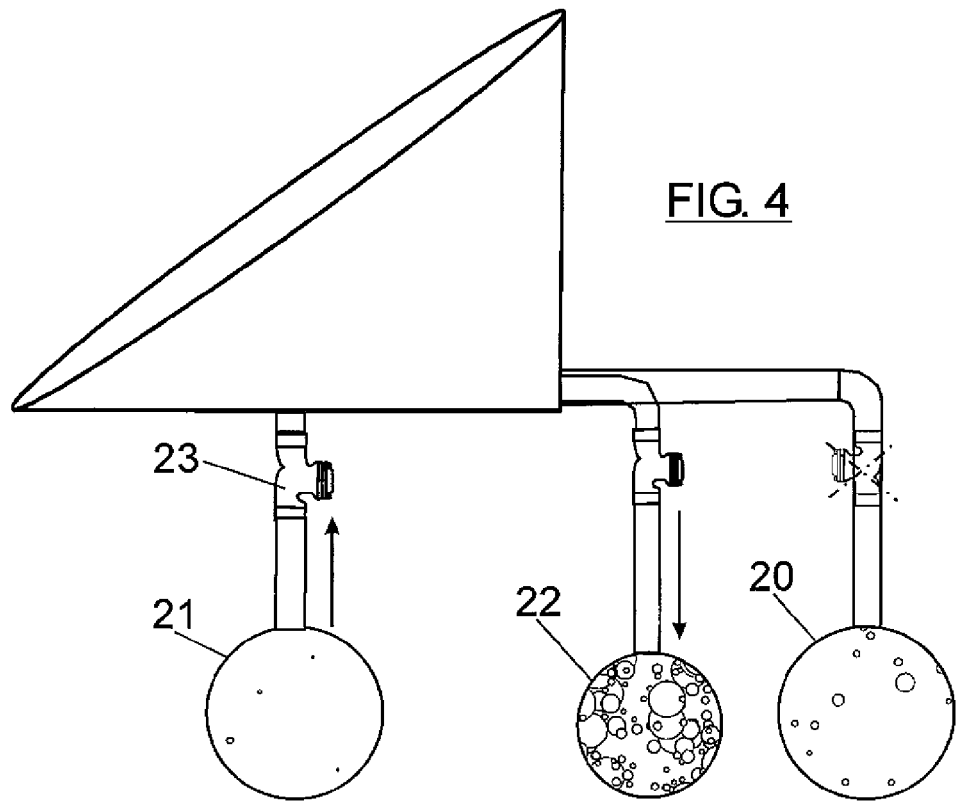

Below is a complete description of a preferred execution of the aforementioned device, which is presented an example but with a non-limiting nature, susceptible to all the modifications of details that do not fundamentally alter its essential characteristics.

The device is comprised of a vertical cylindrical exterior casing (1), whose lower base is closed by a watertight circular lid on which there is placed tangentially a pipe (2) that conducts the entering gross liquid to the filter. This pipe is prolonged by means of a piece that makes the gradual change from the circular shape of the pipe to another rectangular shape (4) and adapting to the periphery of the indicated base in a course of approximately half the circumference. Next a trap (5), located in the lower part, traps the heavy particles that have been concentrated there through the action of gravity and the centrifugal force, remaining stored in the lower impurities chamber (6). The upper part of this trap is formed by a warped surface (7), whose special shape causes the liquid flow that comes from the semicircular piece to have an ascending helicoidal movement that results tangential to an inserted cylindrical mesh panel (8). This helicoidal movement of the liquid pulls the solid particles towards the periphery and less-active upper parts for filtering.

With a smaller radius there is a package of slotted rings (9) concentric to an interior collector pipe (10) concentric to the exterior casing, that is perforated and welded to the lower lid, passing through it to serve as the final outlet element of the filtered liquid. A threaded terminal or other joining element allows coupling between the filter and the aforementioned interior collector pipe.

The filtering system includes three filtering stages, the cyclonic stage for the separation of the dense solids (5), that of the mesh (8) for the medium-sized particles and that of the rings (9) for the small particles, leaving the solid impurities separated in different areas, which signifies less silting and a reduction of the number of washings needed per filter.

The upper base of the outer cylindrical casing is closed by a removable lid (11) with watertight elements and closed, generally, by a lever clamp, with this lid having one or several suction ball valves (12), as well as several concentric notches. The notch with the largest diameter serves to fasten the mesh panel and the smaller one centres a compression spring (13) of the ring package, which acts on an omega-shaped piece made with thermoplastic, whose central part (14) guides the compression spring and slides on the exterior part of the interior collector pipe (10) leaving between both pieces a variable chamber (15) connected to the lower part of the interior collector pipe by another pipe with a small diameter (16).

When a single filtering system is used, cleaning is done manually, removing the upper lid through which all the elements to be clean come out, but when there are several units that make up the filtering equipment, the filters can be cleaned sequentially in two complementary ways. The gravity stage is carried out by closing the valves located on the entry of the tangential pipe (2) to the lower base of the cylindrical casing and the two-way valve located at the outlet of the interior collector pipe (10), at the same time the valve located at the outlet (18) of the lower impurities chamber is opened, with these impurities removed by gravity descending through the one-way hatches (19) swept by the water that is discharged from the filter. These one-way hatches are maintained closed by simple mechanisms, for example a spring, and as the pressure gradient is positive, they will not tend to open during filtering.

The stage of cleaning by reverse flow or backwash is then carried out. In this process, the valve (25) that communicates with the filtered liquid connector is opened. Then, the pipe with a small diameter (16) provides water to the variable chamber (15) at the maximum pressure so that the action of the spring gives way and the ring package is released. In this reverse flow operation, the water shooting out of the slanted holes of the interior collector pipe (10) produces on the rings a spinning movement with multiple movements to release the particles retained in their slots. The cleaning operations are enhanced by the action of two floating brushes (17) that scrape the mesh and the rings when the move up and down with the level of the liquid in the filter.

The filters are placed parallel between the general collector of the entering gross liquid (20) and the general outlet collector of filtered liquid (21). Each filter has an outlet that collects the cleaning water in the drainage collector (22). The flow of all the collectors is regulated by means of the corresponding valves.

In the filtering process the general outlet of the liquid must remain at an approximately constant pressure, which does not usually occur in the filtering equipment currently marketed, since the outlet pressure is greater when the filters are clean and lower when the filters are silted, becoming minimal when the cleaning begins, since in addition one must divert the backwash flow. To avoid this, a pressure regulating mechanism is installed downstream in one or several outlet valves (23), which guarantees a constant operating pressure in the network, even when the backwash process is started. In this way only the filters equipped in their outlet valve with a regulator device will work at a variable flow, with the functioning of the remaining valves being at optimal flow, which facilitates the greater pulling of the dirt to the peripheral and upper areas by the helicoidal movement of the liquid.

According to the cleaning order by minimal differential pressure, by flow or by time, it proceeds sequentially to each filter, leaving for the end the filters with regulating valves, if there were any. In the first place, the valves (23 and 25) are closed, except that of the drainage (24), in whose layout the liquid content in the filter is discharged, pulling the dirt through the draining collector. Then the filtered liquid valve (23) is opened, letting a sufficient amount to enter to perform the backwash process, then this inlet is shut off and it is allowed to drain out, repeating the operation as many times as required depending on the degree of cleaning required.

The change of valves, passing of the gross liquid and the closing of the drainage, leaves the filter in its filtering operation. The entire sequence of operations for complex installations must be entrusted to automatic programming.

The invention claimed is:

1. A liquid filtering system comprising:
   a vertical cylindrical outer casing having a first base and a second base opposite to the first base;
   filtering elements necessary to eliminate solid impurities in different successive phases, the filtering elements being housed in an interior of the outer casing;
   a pipe that penetrates tangentially through first base of the outer casing through which liquid to be filtered enters the pipe being extended by a flow adaption piece making a gradual change from a circular section of the pipe to a rectangular section producing circular paths, wherein heavy particles descend and approach a periphery from gravity and centrifuge;
   an interior collector pipe concentric to the outer casing with a lower outlet proximate the first base for filtered liquid; and
   a removable watertight lid placed in the second base of the outer casing;
   a cylindrical mesh panel concentric with the interior collector pipe, the cylindrical mesh panel being intermediate the interior collector pipe and the cylindrical outer casing;
   a cylindrical package of slotted rings compressed by a spring, the cylindrical package being concentric with the interior collector pipe, the cylindrical package being intermediate the interior collector pipe and the cylindrical mesh panel; and
   an omega-shaped piece guiding the spring and adapts to an exterior of the interior collector pipe, leaving a chamber of variable volume between the interior collector pipe and the outer casing, the chamber being connected to a lower part of the interior collector pipe by a pipe with a smaller diameter than the interior collector pipe.

2. Liquid filtering system according to claim 1, wherein the interior collector pipe concentric to the outer casing is perforated and welded to the first base, passing through the interior collector pipe to serve as a final outlet element of the filtered liquid.

3. Liquid filtering system according to claim 1, wherein the system is placed in a lower area of a trap to collect particles that remain stored in an impurities chamber that contains one-way hatches operated by a spring.

4. Liquid filtering system according to claim 1, wherein the removable watertight lid comprises at least one suction ball mechanisms to facilitate inlet and outlet of air in filling and emptying of the filter.

5. Liquid filtering system according to claim 4, wherein the removable watertight lid includes concentric circular notches for fastening the filtering elements.

6. Liquid filtering system according to claim 5, wherein the cylindrical mesh panel is fastened on the concentric circular notch with the largest diameter.

7. Liquid filtering system according to claim 5, wherein a spring is centered on the notch with the smallest diameter, which produces compression of package of slotted rings placed concentric to the interior collector pipe.

8. Liquid filtering system according to claim 1, further comprising floating brushes housed among the filtering elements that move up and down with a level of the liquid in the filter and scrape filtering surfaces to pull away dirt.

9. Liquid filtering system according to claim 1, wherein the interior collector pipe includes a plurality of holes formed with a fixed angle and location so that a cleaning reverse flow shot through the holes hits an inside of the cylindrical package of slotted rings and produces spinning and separation of the rings.

10. Cleaning procedure of the liquid filtering system described in claim 1, the procedure comprising a gravity stage and a second stage of cleaning by reverse flow.

11. Cleaning procedure of the liquid filtering system according to claim 10, the gravity stage including the following sub-stages:
    a valve located on an entrance of the tangential pipe to the first base of the cylindrical casing and a two-way valve located at the outlet of the interior collector pipe are closed;
    a valve located in an outlet of a lower impurities chamber is opened;
    impurities descend by gravity through one-way hatches, pulled by the liquid, discharged from the filter.

12. Cleaning procedure of the liquid filtering system according to claim 10, wherein the cleaning stage by reverse flow comprises the following sub-stages:
- a two-way valve located at the outlet of the interior collector pipe is opened;
- the pipe with a small diameter that connects the chamber of variable volume to the lower part of the interior collector pipe provides water to the variable chamber at the maximum pressure so that the action of the spring gives way and releases a package of slotted rings;
- water shooting from holes in the interior collector pipe produces in the rings a spinning movement with multiple movements to release particles retained in the slots;
- the reverse flow pulls the impurities passing through the one-way hatches to a lower impurities chamber and together with dense solids trapped in the gravity stage, pass to an exterior.

* * * * *